Feb. 14, 1956     R. E. NEWELL     2,734,563
ELECTRICALLY CONTROLLED VALVE FOR GAS LINES AND THE LIKE
Filed April 26, 1952     2 Sheets-Sheet 1

INVENTOR.
ROBERT E. NEWELL.
BY Archworth Martin
his ATTORNEY.

Feb. 14, 1956 R. E. NEWELL 2,734,563
ELECTRICALLY CONTROLLED VALVE FOR GAS LINES AND THE LIKE
Filed April 26, 1952 2 Sheets-Sheet 2
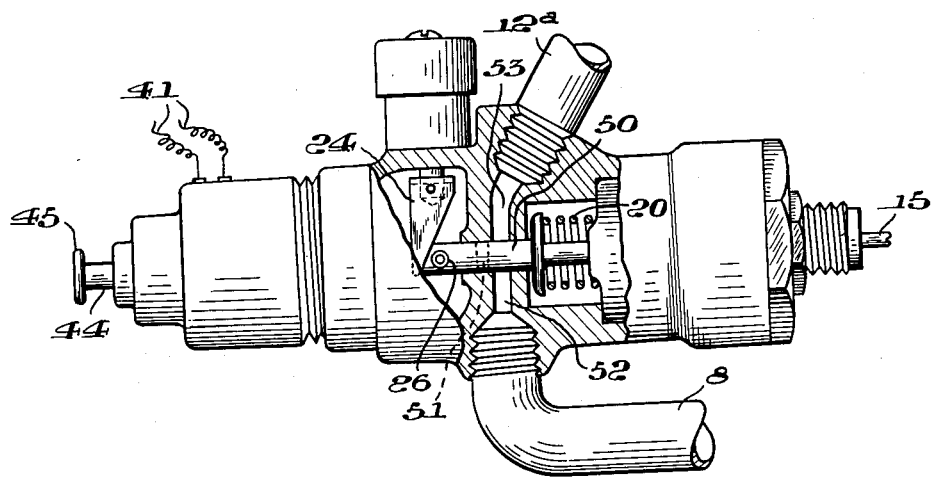
Fig. 7.
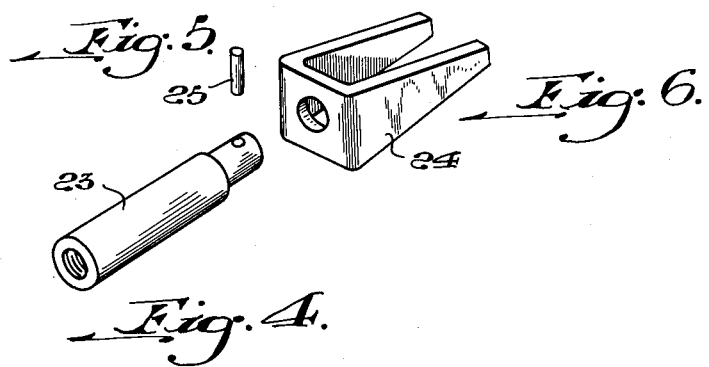
INVENTOR.
ROBERT E. NEWELL
BY Archworth Martin
his ATTORNEY.

United States Patent Office 2,734,563
Patented Feb. 14, 1956

2,734,563

ELECTRICALLY CONTROLLED VALVE FOR GAS LINES AND THE LIKE

Robert E. Newell, Irwin, Pa.

Application April 26, 1952, Serial No. 284,629

8 Claims. (Cl. 158—129)

While my invention is herein shown as employed in the electrical operation of relay valves for controlling pressure-operated main valves such as those of the diaphragm type, that are used in controlling flow of gas to gas burners, various features of the invention are also useful in controlling the operation of valves of gas lines or the like for other purposes. The invention is a modification of and an improvement upon the apparatus described and claimed in my copending application Serial No. 282,848, filed April 17, 1952.

My invention has for its objects the provision of valve apparatus possessing the advantages inherent in the apparatus of my said application and which requires fewer moving parts, and which is simpler and safer in operation than is the case with various types of gas control devices heretofore employed.

Figure 1:
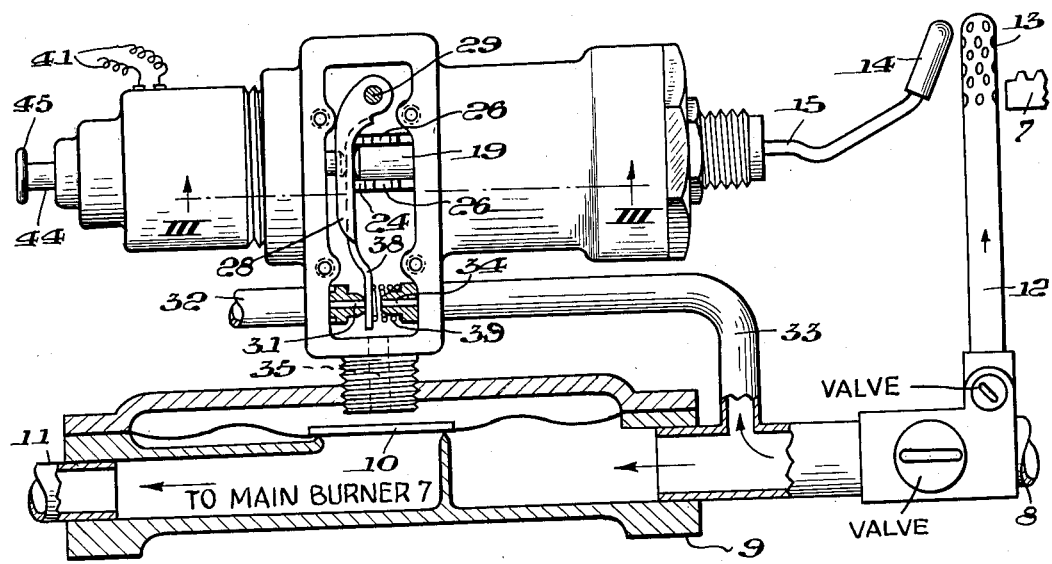
Figure 2:
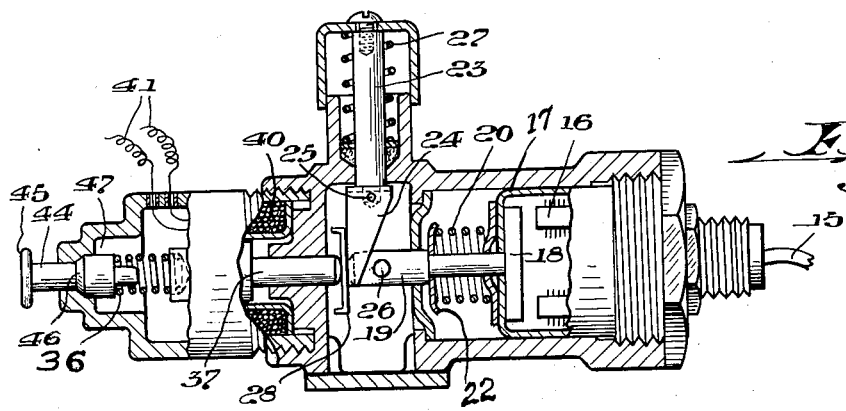
Figure 3:
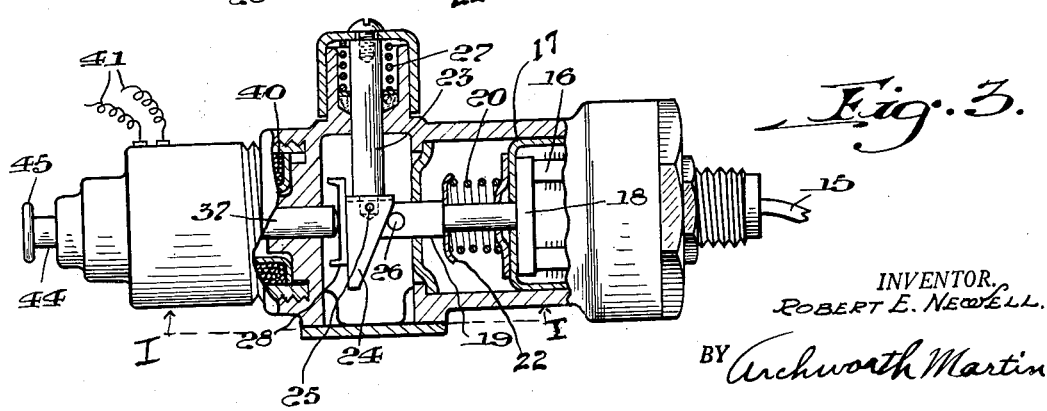

Some of the forms which my invention may take are shown in the accompanying drawings, wherein Figure 1 is a view, partly in side elevation and partly in section, and somewhat schematic, of one structural arrangement, and taken on the line I—I of Fig. 3; Fig. 2 is a view showing the parts of the structure of Fig. 1 in safety position; Fig. 3 is a view taken on the line III—III of Fig. 1 and showing the valve parts in position for shut off gas to a burner; Figs. 4, 5 and 6 are perspective views of the resetting plunger and wedge of Figs. 1 and 2, and Fig. 7 is a view showing a modification, wherein provision is made for automatically controlling also the flow of gas to a pilot burner.

Referring first to Fig. 1, a main gas burner is shown at 7 and will be supplied from a gas line 8 through a diaphragm valve casing 9 and past a diaphragm valve 10 to a line 11 that will lead to the burner 7.

A pipe 12 leads to a pilot burner 13 adjacent to which is positioned a thermocouple 14 whose wires lead through a conduit 15 to an electromagnet 16 that is mounted in a housing 17. An armature 18 cooperates with the magnet and carries a stem 19 that is urged by a spring 20 in a direction to move the armature away from the magnet, the spring seating against the housing 17 for the magnet and a disc 22 on the stem 19.

A push rod 23 is slidably mounted in a side wall of the housing 17 and carries an operating wedge 24 on its inner end which is loosely connected to the rod 23 by a pin 25. The wedge 24 has its inclined edges engageable with anti-friction rollers 26 journaled on opposite sides of the stem 19. When the rod 23 is depressed against the spring 27, from the position shown in Fig. 2 to that shown in Fig. 3, the armature 18 will be moved against the spring 20 and into engagement with the poles of the magnet 16, as shown in Fig. 3. This movement also rocks a valve lever 28 about its pivotal support 29, into engagement with an exhaust port 31, if it is not already in such position. The port 31 communicates with a discharge line 32 that may exhaust to atmosphere or lead to the vicinity of the pilot burner 13. With the parts in the position just named, gas from the line 8 will flow through a by-pass 33, a port 34 and a port 35 to the upper side of the diaphragm 10 to close the same and shut off flow to the main burner. The pilot flame can then safely lit by the attendant. Similarly, when the magnet 16 is energized through heating of the thermocouple 14 by the pilot flame at 13, the armature 18 will be held in the position shown in Fig. 3, so that when the rod 23 is released to move to the position shown in Fig. 2, a spring 36 acting against a magnet core 37, when compressed as hereinafter stated will move the valve 38 away from exhaust port 31 and into engagement with the port 34, so that the diaphragm 10 can be raised by the gas pressure and gas flow through the line 11 to the burner 7.

If now the pilot 13 becomes extinguished and the magnet 16 therefore de-energized, the spring 20 will expand to push the innermost nose of the stem 19 against the valve lever 28 to swing the valve 38 closed against the port 31, thus opening the port 34 for the admission of gas pressure against the upper side of the diaphragm 10, and thereby shutting off flow of gas to the main burner. The spring 20 may suitably have an expansive force of about one and one-fourth pounds, while the spring 36 when compressed will exert a counterforce of only perhaps ten ounces in resistance to closure of the port 31 by the valve 38. In the position shown in Fig. 2, the spring 36 is in equilibrium, or at zero pressure.

In order to reset the mechanism for supply of gas to the main burner, the rod 23 will be depressed as above explained, to hold the valve 38 closed against the port 31 and to move the armature 18 into engagement with the poles of the magnet 16. To insure that the valve 38 will thus be held tightly closed during the lighting of the pilot and to compensate for irregularities in moving parts, the wedge has loose fit on the rod 23 and can therefore automatically adjust itself or "float" relative to the rod and the other movable members. When the pilot had heated the thermocouple sufficiently, the push rod 23 will be released by the operator, so that it can return to the position shown in Fig. 2 and the valve lever 28 swung by a spring 36 to open position with respect to the exhaust port 31, thus allowing the diaphragm 10 to be raised by the gas pressure. The spring 39 exerts a pressure of perhaps two ounces for moving the valve 38 to the left.

An additional control device is provided for the valve 38, this device comprising an electromagnet 40 that is energized from an electric line 41 which is, in turn, controlled by the switch of a room thermostat, this magnet which may have a "pull" of eight ounces, actuates the movable core 37 to move to the right, into engagement with the valve lever 28, and against the pressure of the spring 39 which normally urges the valve 38 to close the exhaust 31, when the wedge 24 is withdrawn as in Fig. 2 and the armature 18 is held by the magnet 16 as in Fig. 3. This action by the magnet will occur when more heat is required in the vicinity of the thermostat, to allow flow of gas past the diaphragm 10 to the main burner.

When the room thermostat temperature becomes too high, the thermostat will operate to operate the circuit 41 and the magnet 40 will become de-energized to allow the spring 39 to move the valve 38 closed at port 31 and allow gas pressure to enter against the upper side of the diaphragm 10 and shut off flow of gas to the main burner. These operations will be effected without disturbing the armature 18 and its associated parts.

If there is power failure in the line 41 thus rendering the room thermostat ineffective, the operator can secure more heat by depressing a plunger 44 which carries a stop shoulder 45, to depress it against the spring 36 and thus push the valve 38 away from the port 31 and against the port 34, so that gas can again flow past the diaphragm to the main burner. This movement will take place only when the armature 18 is held against its magnet and the push rod 23 is in its outer position, and the pilot 13 therefore burning. The plunger 44 can temporarily be held in this position by a shoulder 46 thereon which can be moved behind a stop surface 47 through slight lateral movement of the plunger.

When power is restored to the line 41 and the room thermostat again takes control, the natural vibrations of the magnet will dislodge the plunger for expansive movement under its spring 36. If an attempt is made to increase gas flow to the main burner through depression of the plunger 44 when the pilot is extinguished and the armature 18 and its associated parts occupy the position shown in Fig. 2, depression of the plunger against the spring 36 will be ineffective to move the valve in opposition to the spring 20, since the spring 36 may have only ten ounces expansive pressure to the one and one-fourth pounds resistance of the spring 20, thus avoiding flow of gas to the main burner, when the pilot is extinguished. Even if the eight-ounce pull of the magnet be added to the pressure of the spring 36, the force will be less than the resistance of the springs 20 and 39. Also, the greater force of the spring 20 will be effective to dislodge the shoulder 46 from engagement with the stop shoulder 47 upon failure of the pilot flame, thus insuring that the valve 38 will close the exhaust port 31 and causing shutting off of flow to the outer side of the diaphragm 19.

Referring now to Fig. 7, I show an arrangement, wherein there is automatic control also of the supply of gas to the pilot burner 13. In this case, the stem 50 that corresponds to the stem 19 of Figs. 2 and 3, has a port 51 therethrough to provide communication between a port 52 that is supplied from the gas line 8a and a port 53 through which gas is supplied to the pilot line 12a that leads to the pilot burner 13. The stem therefore serves as a valve for controlling pilot gas. When the armature 18 is released through extinguishment of the pilot burner and de-energization of the magnet 16, the spring 20 will move the stem 50 to the position shown in Fig. 7, thus preventing flow of gas also to the pilot flame, since at such position of the parts, the valve 38 occupies the position shown in Fig. 1, with the diaphragm valve 10 consequently closed.

When it is desired to light the pilot burner, the push rod 23 will be depressed to the position shown in Fig. 3. This will bring the port 51 into registry with the ports 52—53 to provide flow of gas to the pilot burner and consequently permit lighting of the burner. When the magnet 16 becomes thereby energized, the armature 18 will be held at its right-hand position, against the poles of the magnet and in opposition to the spring 20, so that the port 51 will be held in registry with the ports 52—53 and the supply of pilot gas thereby maintained until de-energization of the magnet 16.

I claim as my invention:

1. Valve-controlling apparatus for gas lines, comprising a control valve casing having an inlet port, an outlet port and a third port, a valve movable to close either the inlet port or the outlet port, an electromagnet having an armature that is engageable with the valve to close it at the outlet port, a spring for moving the armature away from the magnet and against the valve when the magnet becomes de-energized, a manually-operable member for moving the valve closed at the outlet port and moving the armature into engagement with the magnet, to be held thereby against the spring presssure when the magnet becomes energized, a spring for holding the valve closed at the outlet port while the armature is energized, and a manually-tensionable spring of relatively weaker expansive force than the first-named spring and of greater force than the second-named spring, for moving the valve away from the outlet port and to close the inlet port, when the manually-operable member has returned to its neutral position and while the armature is held by the magnet.

2. Valve-controlling apparatus for gas lines, comprising a control valve casing having an inlet port, an outlet port and a third port, a valve movable to close either the inlet port or the outlet port, an electromagnet having an armature that is movable away from the magnet and against the valve, to close it against the outlet port, a spring for moving the armature away from the magnet and against the valve when the magnet becomes de-energized, to thereby close the outlet port, a manually-operable member for releasably holding the valve closed at the outlet port and for moving the armature into engagement with the magnet, to be held thereby against the spring pressure while the magnet is energized, and a second thermally-controlled magnet of relatively weaker force than the said spring, and having a core that is movable to shift the valve away from the outlet port and to close the inlet port, while the armature is held by the magnet.

3. Valve-controlling apparatus for gas lines, comprising a control valve casing having an inlet port, an outlet port and a third port, a valve movable to close either the inlet port or the outlet port, an electromagnet having an armature that is movable away from the magnet and against the valve, to close it against the outlet port, a spring for moving the armature away from the magnet when the magnet becomes de-energized, to thereby close the outlet port, a manually-operable member for releasably holding the valve closed at the outlet port and for moving the armature into engagement with the magnet, to be held thereby against the spring pressure while the magnet is energized, a second thermally-controlled magnet of relatively weaker force than the said spring, and having a core that is movable to shift the valve away from the outlet port and to close the inlet port, while the armature is held by the magnet, and a spring for holding the valve closed against the outlet port when the second-named magnet is de-energized.

4. Valve-controlling apparatus for gas lines, comprising a control valve casing having an inlet port, an outlet port and a third port, a valve movable to close either the inlet port or the outlet port, an electromagnet having an armature that is movable away from the magnet and against the valve, to close it against the outlet port, a spring for moving the armature away from the magnet when the magnet becomes de-energized, to thereby close the outlet port, a manually-operable member for releasably holding the valve closed at the outlet port and for moving the armature into engagement with the magnet, to be held thereby against the spring pressure while the magnet is energized, a second thermally-controlled magnet of relatively weaker force than the said spring, and having a core that is movable to shift the valve away from the outlet port and to close the inlet port, while the armature is held by the magnet, a manually-tensionable spring of weaker resistance than the first-named spring, for releasably holding the valve open at the outlet port and closed at the inlet port while the armature is held by its magnet, means for automatically releasing the last-named spring when one of the magnets becomes de-energized, and a spring for moving the valve to open the inlet port and close the outlet port when the second-named spring is untensioned and the second-named magnet becomes de-energized.

5. A valve-controlling apparatus for gas lines, comprising a control valve casing having an inlet port, an outlet port and a third port, a valve movable to close either the inlet port or the outlet port, an electromagnet having an armature that is engageable with the valve to move it closed against the outlet port, a spring for moving the armature away from the magnet when the magnet becomes de-energized, to thereby close the outlet port, a manually-operable member for releasably holding the valve against the outlet port and for moving the armature into engagement with the magnet, to be held thereby against the spring pressure while the magnet is energized, a movable core, a spring of relatively weaker expansive force means for manually tensioning this spring to shift the core to move the valve away from the outlet port and to close the inlet port, while the armature is held by the magnet, a second-thermally-controlled electromagnet for moving the core to advanced position against the valve and thereby close it against the inlet port and open the outlet port, and a third spring for holding the valve closed against the outlet port when both magnets are in a de-energized condition, the holding force of the second-named magnet being less than the expansive force of the first-named spring.

6. Valve-controlling apparatus for gas lines, comprising a control valve casing having an outlet port and an inlet port communicating therewith, a valve movable to open and close the outlet port, an electromagnet having an armature that is engageable with the valve to close it at the outlet port, a spring for moving the valve to close the outlet port when the magnet becomes de-energized, a manually-operable member for moving the valve closed at the outlet port and shifting the armature into engagement with the magnet to be held thereby against the spring pressure when the magnet becomes energized, a spring of relatively weaker expansive force than the other spring, for moving the valve open at the outlet port, when the manually-operable member has returned to its neutral position and while the armature is held by the magnet and a still weaker spring for holding the valve against the outlet.

7. Valve-controlling apparatus for gas lines, comprising a control valve casing having an outlet port and an inlet port communicating therewith, a valve movable to open and close the outlet port, an electromagnet having an armature that is engageable with the valve to close it at the outlet port, a spring for moving the valve to close the outlet port when the magnet becomes de-energized, a manually-operable member for moving the valve closed at the outlet port and shifting the armature into engagement with the magnet to be held thereby against the spring pressure when the magnet becomes energized, a spring of relatively weaker expansive force than the other spring, for moving the valve open at the outlet port, when the manually-operable member has returned to its neutral position and while the armature is held by the magnet, a pilot gas line, and a valve therefor which is opened by said manual member when operated to close the first-named valve and shift the armature against its magnet.

8. Valve-controlling apparatus for gas lines, comprising a control valve casing having an outlet port and an inlet port communicating therewith, a valve movable to open and close the outlet port, an electromagnet having an armature that is engageable with the valve to close it at the outlet port, a spring for moving the valve to close the outlet port when the magnet becomes de-energized, a manually-operable member for moving the valve closed at the outlet port and shifting the armature into engagement with the magnet to be held thereby against the spring pressure when the magnet becomes energized, a spring of relatively weaker expansive force than the other spring, for moving the valve open at the outlet port, when the manually-operable member has returned to its neutral position and while the armature is held by the magnet, a pilot gas line, and a valve therefor which is opened by said manual member when operated to close the first-named valve and shift the armature against its magnet, the valve being connected to the armature so that it will be held open while the magnet remains energized.

References Cited in the file of this patent

UNITED STATES PATENTS

| | | |
|---|---|---|
| 2,265,294 | Lange | Dec. 9, 1941 |
| 2,292,477 | Ray | Aug. 11, 1942 |
| 2,294,694 | Ray | Sept. 1, 1942 |
| 2,372,564 | Engholdt | Mar. 27, 1945 |
| 2,487,323 | Fewell | Nov. 8, 1949 |
| 2,512,173 | Ray | June 20, 1950 |